United States Patent
Qiu et al.

(10) Patent No.: US 12,371,072 B2
(45) Date of Patent: Jul. 29, 2025

(54) OPERATOR TAKE-OVER PREDICTION

(71) Applicant: Honda Motor Co., Ltd., Tokyo (JP)

(72) Inventors: Yuning Qiu, Plano, TX (US); Teruhisa Misu, San Jose, CA (US); Kumar Akash, Milpitas, CA (US)

(73) Assignee: Honda Motor Co., Ltd., Tokyo (JP)

(*) Notice: Subject to any disclaimer, the term of this patent is extended or adjusted under 35 U.S.C. 154(b) by 309 days.

(21) Appl. No.: 17/570,573

(22) Filed: Jan. 7, 2022

(65) Prior Publication Data
US 2023/0109171 A1  Apr. 6, 2023

Related U.S. Application Data (60) Provisional application No. 63/249,457, filed on Sep. 28, 2021.

(51) Int. Cl.
*B60W 60/00* (2020.01)
*B60W 30/095* (2012.01)
(Continued)

(52) U.S. Cl.
CPC ...... *B60W 60/0059* (2020.02); *B60W 30/095* (2013.01); *B60W 40/08* (2013.01);
(Continued)

(58) Field of Classification Search
CPC ......... B60W 60/0059; B60W 60/0053; B60W 30/095; B60W 40/08; B60W 2540/225;
(Continued)

(56) References Cited

U.S. PATENT DOCUMENTS

| | | | | |
|---|---|---|---|---|
| 11,681,364 | B1* | 6/2023 | Zhang | G06N 3/0455 |
| | | | | 345/156 |
| 2016/0005176 | A1* | 1/2016 | Nguyen | G06F 3/013 |
| | | | | 382/103 |

(Continued)

OTHER PUBLICATIONS

K. Akash, N. Jain, and T. Misu, "Toward adaptive trust calibration for level 2 driving automation," in Proceedings of the 2020 International Conference on Multimodal Interaction, 2020, pp. 538-547.

(Continued)

*Primary Examiner* — Navid Z. Mehdizadeh
*Assistant Examiner* — Oliver Tan
(74) *Attorney, Agent, or Firm* — Rankin, Hill & Clark LLP (57) ABSTRACT

According to one aspect, systems, methods, and/or techniques associated with operator take-over prediction may include receiving a two-channel series of images of an operating environment through which a vehicle is travelling. A first series of images may be represented by labels corresponding to classified objects. A second series of images may be represented as a gaze heatmap or an eye tracking heatmap. Additionally, feeding encoded series of images through a three-dimensional (3D) convolutional neural network (CNN) to produce a first output, receiving sets of information corresponding to a first series of images and a second series of images in time, feeding sets of information through processing layers to produce additional outputs, concatenating the first output and the additional outputs to produce a concatenation output, and feeding the concatenation output through additional processing layers to generate an operator take-over prediction may be performed.

19 Claims, 9 Drawing Sheets

(51) Int. Cl.
    *B60W 40/08*     (2012.01)
    *G06F 3/01*     (2006.01)
    *G06N 3/08*     (2023.01)

(52) U.S. Cl.
    CPC ......... *B60W 60/0053* (2020.02); *G06F 3/013* (2013.01); *G06N 3/08* (2013.01); *B60W 2420/403* (2013.01); *B60W 2540/22* (2013.01); *B60W 2540/225* (2020.02)

(58) Field of Classification Search
    CPC ........... B60W 2420/42; B60W 2540/22; G06F 3/013; G06N 3/08
    See application file for complete search history.

(56) References Cited

U.S. PATENT DOCUMENTS

| | | | | |
|---|---|---|---|---|
| 2019/0130639 | A1* | 5/2019 | Boyce | G06F 3/013 |
| 2020/0079395 | A1* | 3/2020 | Ibuka | B60W 60/0053 |
| 2020/0086879 | A1* | 3/2020 | Lakshmi Narayanan | G06V 20/597 |
| 2020/0089977 | A1* | 3/2020 | Lakshmi Narayanan | G06F 18/253 |
| 2020/0272230 | A1* | 8/2020 | Wang | G02B 27/0093 |
| 2020/0311475 | A1* | 10/2020 | el Kaliouby | G06V 10/764 |
| 2021/0056306 | A1* | 2/2021 | Hu | G06V 40/193 |
| 2021/0078609 | A1* | 3/2021 | Barth | B60W 50/08 |
| 2021/0350184 | A1* | 11/2021 | Mallik | G06F 18/217 |
| 2022/0095975 | A1* | 3/2022 | Aluf | B60W 60/0051 |
| 2022/0324490 | A1* | 10/2022 | Akash | B60W 60/0059 |

OTHER PUBLICATIONS

O. Carsten and M. H. Martens, "How can humans understand their automated cars? hmi principles, problems and solutions," Cognition, Technology & Work, vol. 21, No. 1, pp. 3-20, 2019.

J. K. Choi and Y. G. Ji, "Investigating the importance of trust on adopting an autonomous vehicle," International Journal of Human-Computer Interaction, vol. 31, No. 10, pp. 692-702, 2015.

M. Dahnert, A. Dai, L. J. Guibas, and M. Niessner, "Joint embedding of 3d scan and cad objects," in Proceedings of the IEEE/CVF International Conference on Computer Vision (ICCV), Oct. 2019.

N. Du, J. Haspiel, Q. Zhang, D. Tilbury, A. K. Pradhan, X. J. Yang, and L. P. Robert Jr, "Look who's talking now: Implications of av's explanations on driver's trust, av preference, anxiety and mental workload," Transportation research part C: emerging technologies, vol. 104, pp. 428-442, 2019.

N. Du, F. Zhou, E. M. Pulver, D. M. Tilbury, L. P. Robert, A. K. Pradhan, and X. J. Yang, "Predicting driver takeover performance in conditionally automated driving," Accident Analysis & Prevention, vol. 148, pp. 105748, 2020.

M. Galvani, "History and future of driver assistance," IEEE Instrumentation Measurement Magazine, vol. 22, No. 1, pp. 11-16, 2019.

M. Itoh, K. Yoshimura, and T. Inagaki, "Inference of large truck driver's intent to change lanes to pass a lead vehicle via analyses of driver's eye glance behavior in the real world," in Proceedings of SICE Annual Conference, Takamatsu, Japan, Sep. 2007, pp. 2385-2389.

S. Jha and C. Busso, "Estimation of gaze region using two dimensional probabilistic maps constructed using convolutional neural networks," in IEEE International Conference on Acoustics, Speech and Signal Processing (ICASSP 2019), Brighton, UK, May 2019, pp. 3792-3796.

S. Ji, W. Xu, M. Yang, and K. Yu, "3d convolutional neural networks for human action recognition," IEEE Transactions on Pattern Analysis and Machine Intelligence, vol. 35, No. 1, pp. 221-231, 2013.

R. Pokam Meguia, C. Chauvin, S. Debernard, and S. Langlois, "Augmented reality interface design for autonomous driving," in FAST-zero'15: 3rd International Symposium on Future Active Safety Technology Toward zero traffic accidents, 2015, 2015.

N. C. Mithun, J. Li, F. Metze, and A. K. Roy-Chowdhury, "Learning joint embedding with multimodal cues for cross-modal video-text retrieval," in Proceedings of the 2018 ACM on International Conference on Multimedia Retrieval, 2018, pp. 19-27.

M. Miyaji, H. Kawanaka, and K. Oguri, "Study on effect of adding pupil diameter as recognition features for driver's cognitive distraction detection," in 2010 7th International Symposium on Communication Systems, Networks Digital Signal Processing (CSNDSP 2010), 2010, pp. 406-411.

L. J. Molnar, L. H. Ryan, A. K. Pradhan, D. W. Eby, R. M. St. Louis, and J. S. Zakrajsek, "Understanding trust and acceptance of automated vehicles: An exploratory simulator study of transfer of control between automated and manual driving," Transportation Research Part F: Traffic Psychology and Behaviour, vol. 58, pp. 319-328, 2018.

Y. Murphey, D. S. Kochhar, P. Watta, X. Wang, and T. Wang, "Driver lane change prediction using physiological measures," SAE International Journal of Transportation Safety, vol. 3, No. 2, pp. 118-125, Jul. 2015.

J. Ngiam, A. Khosla, M. Kim, J. Nam, H. Lee, and A. Ng, "Multimodal deep learning," in International conference on machine learning (ICML2011), Bellevue, Wa, USA, Jun.-Jul. 2011, pp. 689-696.

B. E. Noah, P. Wintersberger, A. G. Mirnig, S. Thakkar, F. Yan, T. M. Gable, J. Kraus, and R. McCall, "First workshop on trust in the age of automated driving," in Proceedings of the 9th International Conference on Automotive User Interfaces and Interactive Vehicular Applications Adjunct, New York, NY, USA, 2017, AutomotiveUI '17, p. 15-21, Association for Computing Machinery.

C.J.D. Patten, A. Kircher, J. Östlund, L. Nilsson, and O. Svenson, "Driver experience and cognitive workload in different traffic environments," Accident Analysis & Prevention, vol. 38, No. 5, pp. 887-894, Sep. 2006.

Y. Qiu, T. Misu, and C. Busso, "Driving anomaly detection with conditional generative adversarial network using physiological and can-bus data," in ACM International Conference on Multimodal Interaction (ICMI 2019), Suzhou, Jiangsu, China, Oct. 2019, pp. 164-173.

Y. Qiu, T. Misu, and C. Busso, "Use of triplet loss function to improve driving anomaly detection using conditional generative adversarial network," in Intelligent Transportation Systems Conference (ITSC 2020), Rhodes, Greece, Sep. 2020, pp. 1-7.

A. Rangesh, N. Deo, R. Greer, P. Gunaratne, and M. Trivedi, "Predicting take-over time for autonomous driving with real-world data: Robust data augmentation, models, and evaluation," 2021.

M. Walch, K. Lange, M. Baumann, and M. Weber, "Autonomous driving: investigating the feasibility of car-driver handover assistance," in Proceedings of the 7th international conference on automotive user interfaces and interactive vehicular applications, 2015, pp. 11-18.

P. Wintersberger, B. E. Noah, J. Kraus, R. McCall, A. G. Mimig, A. Kunze, S. Thakkar, and B. N. Walker, "Second workshop on trust in the age of automated driving," in Adjunct Proceedings of the 10th International Conference on Automotive User Interfaces and Interactive Vehicular Applications, New York, NY, USA, 2018, AutomotiveUI '18, p. 56-64, Association for Computing Machinery.

Y. Yang, B. Karakaya, G. C. Dominioni, K. Kawabe, and K. Benglers, "An hmi concept to improve driver's visual behavior and situation awareness in automated vehicle," in 2018 21st International Conference on Intelligent Transportation Systems (ITSC). IEEE, 2018, pp. 650-655.

K. Zeeb, A. Buchner, and M. Schrauf, "What determines the take-over time? an integrated model approach of driver take-over after automated driving," Accident analysis & prevention, vol. 78, pp. 212-221, 2015.

N. Li and C. Busso, "Driver mirror-checking action detection," in DSP for In-Vehicle Systems and Safety, H. Abut, J.H. L. Hansen, G. Schmidt, K. Takeda, and H. Ko, Eds., Intelligent Vehicles and Transportation, pp. 55-76. DeGruyter, Jul. 2017.

B. Wandell, Foundation of Vision, chapter 3: The Photoreceptor Mosaic, Sinauer Associates Inc, 1985.

\* cited by examiner

OPERATOR TAKE-OVER PREDICTION

CROSS-REFERENCE TO RELATED APPLICATIONS

This application claims the benefit of U.S. Provisional Patent Application, Ser. No. 63/249,457 entitled "OPERATOR TAKE-OVER PREDICTION", filed on Sep. 28, 2021; the entirety of the above-noted application(s) is incorporated by reference herein.

BACKGROUND

Human gaze may be regarded as useful behavioral information. However, gaze information may be difficult to interpret due to noise, for example. Existing models do not model gaze properties as desired. Additionally, gaze information may be noisy or difficult to interpret. A difficulty may be presented during sensing due to cost of sensors. The gaze information may also be random.

BRIEF DESCRIPTION

According to one aspect, a system for operator take-over prediction may include a set of sensors, a processor, and a memory. The set of sensors may receive a two-channel series of images of an operating environment through which a vehicle is travelling. The two-channel series of images may be associated with a first series of images and a second series of images. The first series of images may be represented by one or more labels corresponding to one or more classified objects. The second series of images may be represented as a gaze heatmap or eye tracking heatmap. The processor may feed the encoded series of images through a three-dimensional (3D) convolutional neural network (CNN) to produce a first output. The processor may receive one or more sets of information corresponding to the first series of images and the second series of images in time. The processor may feed one or more of the sets of information through one or more processing layers to produce additional outputs. The processor may concatenate the first output and the additional outputs to produce a concatenation output. The processor may feed the concatenation output through one or more additional processing layers to generate an operator take-over prediction. One or more vehicle systems may implement an action based on the operator take-over prediction.

One or more of the sets of information corresponding to the first series of images and the second series of images in time may include controller area network (CAN) bus information from the vehicle. One or more of the sets of information corresponding to the first series of images and the second series of images in time may include physiological information from an operator of the vehicle. One or more of the sets of information corresponding to the first series of images and the second series of images in time may include navigation information from the vehicle. One or more of the sets of information corresponding to the first series of images and the second series of images in time may include weather information from the operating environment through which the vehicle is travelling.

One or more of the sets of information corresponding to the first series of images and the second series of images in time may include gaze information from an operator of the vehicle. The gaze information may include a mean gaze location value and a standard deviation gaze location value. The gaze information may include an object category vector associated with a center gaze area for a classified object of the one or more classified objects.

One or more of the processing layers may be a dense layer. One or more of the processing layers may be an embedding layer.

According to one aspect, a computer-implemented method for operator take-over prediction may include receiving a two-channel series of images of an operating environment through which a vehicle is travelling. The two-channel series of images may be associated with a first series of images and a second series of images. The first series of images may be represented by one or more labels corresponding to classified objects. The second series of images may be represented as a gaze heatmap or eye tracking heatmap. The computer-implemented method for operator take-over prediction may include feeding the encoded series of images through a three-dimensional (3D) convolutional neural network (CNN) to produce a first output, receiving one or more sets of information corresponding to the first series of images and the second series of images in time, feeding one or more of the sets of information through one or more processing layers to produce additional outputs, concatenating the first output and the additional outputs to produce a concatenation output, and feeding the concatenation output through one or more additional processing layers to generate an operator take-over prediction.

One or more of the sets of information corresponding to the first series of images and the second series of images in time may include controller area network (CAN) bus information from the vehicle. One or more of the sets of information corresponding to the first series of images and the second series of images in time may include physiological information from an operator of the vehicle. One or more of the sets of information corresponding to the first series of images and the second series of images in time may include navigation information from the vehicle. One or more of the sets of information corresponding to the first series of images and the second series of images in time may include weather information from the operating environment through which the vehicle is travelling.

One or more of the processing layers may be a dense layer or an embedding layer.

According to one aspect, a computer-implemented method for operator take-over prediction may include receiving a first series of images of an operating environment through which a vehicle is travelling, performing semantic segmentation on the first series of images to classify and associate pixels of the first series of images with one or more labels, and receiving a second series of images of the operating environment through which the vehicle is travelling. The second series of images may be represented as a gaze heatmap or eye tracking heatmap. The second series of images may correspond to the first series of images in time. The computer-implemented method for operator take-over prediction may include encoding the first series of images and the second series of images as a two-channel series of images, feeding the encoded series of images through a three-dimensional (3D) convolutional neural network (CNN) to produce a first output, receiving one or more sets of information corresponding to the first series of images and the second series of images in time, feeding one or more of the sets of information through one or more processing layers to produce additional outputs, concatenating the first output and the additional outputs to produce a concatenation output, and feeding the concatenation output through one or more additional processing layers to generate an operator take-over prediction.

One or more of the sets of information corresponding to the first series of images and the second series of images in time may include gaze information from an operator of the vehicle. The gaze information may include a mean gaze location value and a standard deviation gaze location value. The gaze information may include an object category vector associated with a center gaze area for a classified object of the one or more classified objects.

DETAILED DESCRIPTION

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

According to one aspect, gaze behavior may be incorporated using joint embedding with a scene context in order to generate an operator take-over prediction. Generally, gaze behavior may be considered useful human behavioral information because gaze behavior may be indicative of a human state, how engaged an operator is with a task, or be indicative of a level of interest associated with the operator, etc. While utilizing a target object of fixation, foveal vision measurements, or observing fixation history may be possible, modeling gaze properties based on a scene context in an accurate fashion may be desirable. Generally, in the human field of view, people generally gaze at an area rather than a point. In this regard, peripheral gaze information may be considered.

Joint embedding of scene information and gaze behavior may be provided. This may be provided as a two-channel series of images, as described in greater detail below. The two-channel series of images may model a relationship between a driver's perception or an operator's perception and a contextual driving environment or operating environment. The images from the two-channel series of images may include semantic segmentation images of road and/or in-vehicle scene or heatmaps of gaze areas (e.g., created using a Gaussian/Laplace filter).

Further, multimodal information fusion may be provided. For example, a vehicle's controller area network (CAN) bus signals and/or the driver's physiological signals may be fused or concatenated with the aforementioned two-channel series of images. Together, this information may be utilized to generate an operator take-over prediction, which may be treated as a binary classification task, according to one aspect. Early fusion or late fusion may be implemented.

Figure 1A:
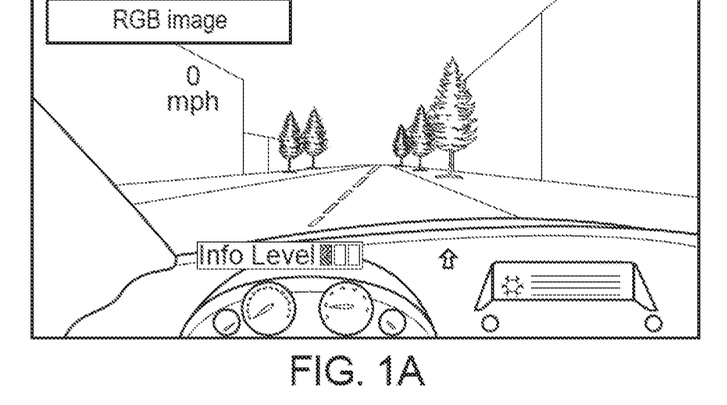
FIGS. 1A-1C are exemplary images in association with operator take-over prediction, according to one aspect.
Figure 1B:
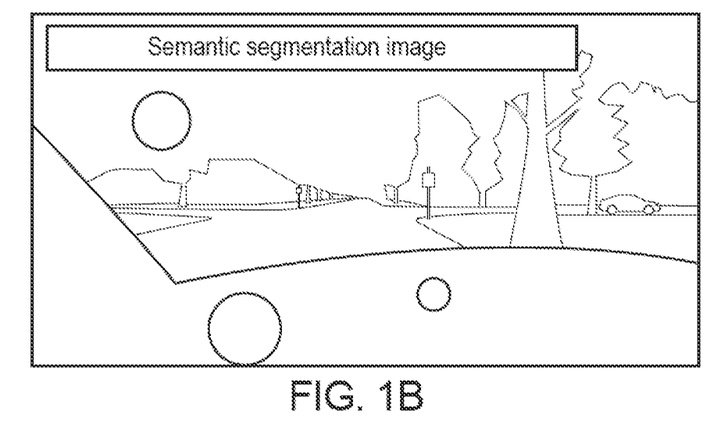
Figure 1C:
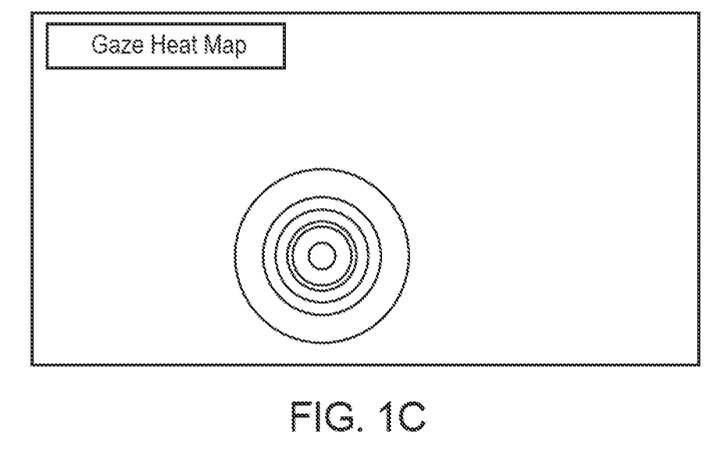

With brief reference to FIGS. 1A-1C, these figures are exemplary images in association with operator take-over prediction, according to one aspect.

FIG. 1A depicts a first, raw image from a first series of images of an operating environment through which a vehicle or autonomous vehicle is travelling.

FIG. 1B depicts a first, processed or semantic segmentation image from the first series of images of the operating environment through which the vehicle or autonomous vehicle is travelling. This image may be derived from the image of FIG. 1A by performing semantic segmentation on the image of FIG. 1A. As a result of performing the semantic segmentation on the image of FIG. 1A, objects (and associated pixels for that object) within the figure are classified, differentiated, or binned into categories.

FIG. 1C depicts an exemplary gaze heat-map indicative of gaze information associated with the image of FIG. 1A. In other words, the center of the bulls-eye of FIG. 1C may be indicative of an increased gaze or focus from the operator of the vehicle.

Figure 2:
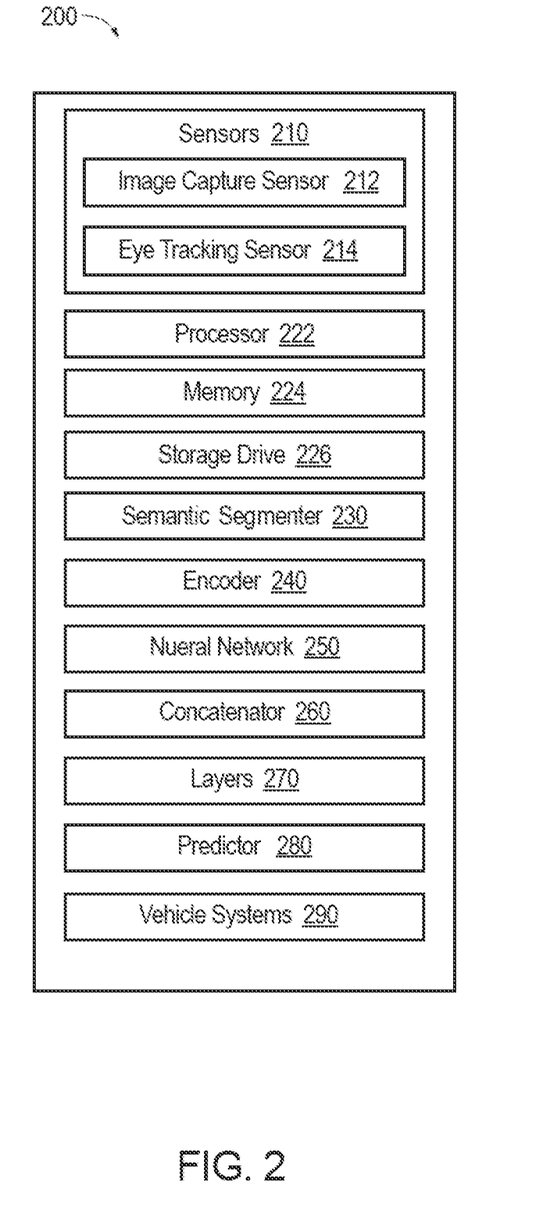
FIG. 2 is an exemplary component diagram of a system for operator take-over prediction, according to one aspect.

FIG. 2 is an exemplary component diagram of a system 200 for operator take-over prediction, according to one aspect. The system 200 for operator take-over prediction may include a set of sensors 210. The set of sensors 210 may include an image capture sensor 212, an eye tracking sensor 214, an infrared sensor, among others. The system 200 for operator take-over prediction may include a processor 222, a memory 224, and a storage drive 226. The system 200 for operator take-over prediction may include a semantic segmenter 230, an encoder 240, a neural network 250, a concatenator 260, one or more layers 270, and a predictor 280. Additionally, the system 200 for operator take-over prediction may include one or more vehicle systems 290, which may include a communication interface, transmitter, receiver, transceiver, etc.

One or more of the aforementioned components (e.g., the semantic segmenter 230, the encoder 240, the neural network 250, the concatenator 260, one or more of the layers 270, and the predictor 280) may be implemented via the processor 222, the memory 224, and/or the storage drive 226. In other words, the processor 222 may perform semantic segmentations, perform encoding, perform neural networking processing by feeding information through the neural network 250 to produce outputs, perform concatenation, generate operator take-over predictions, etc. A bus or one or more busses may facilitate an operable connection or computer communication between one or more of the aforementioned components.

The sensors (e.g., image capture device) may receive a first series of images of an operating environment through which a vehicle or autonomous vehicle is travelling. Additionally, the sensors (e.g., eye gaze or eye tracking sensor 214) may receive a second series of images of the operating environment through which the vehicle is travelling. For example, a first sensor, such as the image capture sensor 212 may receive the first series of images of the operating environment through which the vehicle is travelling as a set or series of RGB images. As another example, a second sensor, such as the eye tracking sensor 214, may receive the second series of images of the operating environment through which the vehicle is travelling as a set or series of gaze heatmap images or eye tracking heatmap images. The processor 222 may apply a Gaussian filter or a Laplacian filter to the information receive from the eye tracking sensor 214. In this way, the second series of images may be generated to represent a gaze heatmap or eye tracking heatmap. According to one aspect, an error associated with the eye tracking sensor 214 may be considered (e.g., via the concatenator 260). According to one aspect, one or more of the sensors may be located on a mobile device and the respective series of images may be captured and transmitted to the system 200 for operator take-over prediction.

The second series of images may correspond to the first series of images in time. In other words, a number of frames associated with the first series of images and a number of frames associated with the second series of images may be the same or be aligned through the same time frame.

The semantic segmenter 230 may perform semantic segmentation on the first series of images to classify and associate pixels of the first series of images with one or more labels.

The encoder 240 may encode the first series of images and the second series of images as a two-channel series of images. Thus, the processor 222 may receive the two-channel series of images of the operating environment through which the vehicle is travelling. The two-channel series of images may be associated with the first series of images and the second series of images. As previously discussed, the first series of images may be represented by one or more labels corresponding to classified objects, as determined by the semantic segmenter 230. In other words, the semantic segmentation performed by the semantic segmenter 230 on the first series of images may result in the generation of a label for each pixel of an image of the first series of images, representing a classified object. In this way, the road scene associated with a gaze area may be represented. This encoded, two-channel series of images may represent or model the relationship between the driver or operator's perception and the contextual driving or operating environment. Therefore, joint embedding of scene information and gaze behavior may be provided via the encoded, two-channel series of images.

The processor 222 may feed the encoded series of images through a three-dimensional (3D) convolutional neural network (CNN) of the neural network 250 to produce a first output. The 3D CNN may extract joint embedding of the gaze and scene information and treat the semantic segmentation images and gaze heatmaps as two channels of the frame of each corresponding timestamp. In other words, the processor 222 may apply the 3D CNN or 3D convolution over the two-channel series of images to derive an embedding of the 3D convolution. By utilizing the 3D CNN, temporal information may be modeled, along with information from past time frames.

According to one aspect, the neural network 250 may be trained during a training phase, such as by utilizing a simulator environment and a simulated autonomous vehicle. For example, when a simulated vehicle's maneuver is not trustable from the viewpoint of a participant, the participant may press a brake pedal. The press of the brake pedal may be represented or indicative of a symbol of a take-over intention and/or distrust. According to one aspect, the training may be formulated as a binary classification task where the participant either trusts or distrusts the autonomous vehicle maneuver or action. If the participant deems the action of the autonomous vehicle to be trustable, the simulated autonomous vehicle may continue operating, while if the participant deems the action of the autonomous vehicle to be non-trustable or indicates distrust, the simulated autonomous vehicle may proceed with a take-over sequence. During the training phase, data may be collected to train the neural network 250, and the 3D CNN, including sets of images similar to the above described first series of images, representing a classified object and the second series of images including the set or series of gaze heatmap images or eye tracking heatmap images, which may be generated based on a Gaussian filter or Laplacian filter.

Other data including physiological data, controller area network (CAN) bus information, complementary information, such as transparency data, navigation information, weather information, etc. may be collected as well. Transparency data may be indicative of a level of information being shared between the vehicle and the operator. For example, the vehicle may show that an object within the operating environment is detected. As another example, internal or intermediate calculations or information from the vehicle may be presented to the operator.

Any of the information or data described herein may be processed, embedded, or normalized to facilitate efficient computation. Mean and standard deviation values associated with a gaze location or area may be calculated for both vertical and horizontal directions. For example, the physiological data may be normalized or Z-normalized. As another example, CAN bus data, such as the RPM or velocity may be normalized and other statistical features (e.g., min, max, mean, standard deviation) may be calculated. As yet another example, complementary information, such as the transparency data, navigation information, weather information may be one-hot embedded.

During execution or an execution phase, the processor 222 may receive one or more sets of information corresponding to the first series of images and the second series of images in time. The one or more sets of information may include a variety of information, such as CAN bus information from the vehicle, physiological information from an operator of the vehicle, navigation information from the vehicle, weather information from the operating environment through which the vehicle is travelling, and gaze information from an operator of the vehicle.

Examples of the driver's physiological data which may be sampled and fused or concatenated with the aforementioned two-channel series of images include heart rate, galvanic skin response (GSR), etc. In this regard, heart rate monitors or GSR monitors may be included in any associated system as a sensor of the set of sensors 210.

As discussed, vehicle CAN bus information may also be utilized, including throttle, steering angle, RPM information, velocity information, etc. Further, complementary information, such as transparency information, navigation information, weather information, etc. may be fused as well.

The gaze information may include a mean gaze location value and a standard deviation gaze location value. The gaze information may include an object category vector associated with a center gaze area for a classified object of the one or more classified objects.

The processor 222 may feed one or more of the sets of information through one or more processing layers 270 to produce additional outputs. One or more of the processing layers 270 may be a dense layer, an embedding layer, an output layer associated with a Sigmoid function, a bottleneck layer, etc.

The concatenator 260 may concatenate the first output and the additional outputs to produce a concatenation output. In this way, information from multiple modalities may be considered. Explained yet again, multi-modal information fusion may be provided because the other sets of information may enable the system 200 for operator take-over prediction to consider information from the vehicle's CAN bus, information regarding the driver or operator's physiological state, etc. Stated another way, this concatenation of the other sets of information may enable the system 200 for operator take-over prediction to model the relationship between the vehicle's driving patterns (e.g., based on the CAN bus information, the navigation information, etc.) and the driver or operator's reactions (e.g., based on the sensed physiological information).

According to one aspect, for each driving segment with a preset window size, feature representations of different modalities may be extracted using various branches and respective embeddings may be concatenated to predict the operator take-over. For example, driving segments associated with a brake action may be labelled as '1' while driving segments associated with no brake action may be labelled as '0'. In any event, data from different modalities may pass through corresponding branches of the 3D CNN or processing layers 270 of the neural network 250, and the extracted feature embeddings, including the joint embedding of segments images and gaze heatmaps, may be concatenated together. Further, the concatenator 260 may concatenate one or more bottleneck layers features as input features to train and test a support vector machine (SVM).

The processor 222 may feed the concatenation output through one or more additional processing layers 270 to enable the predictor 280 to generate an operator take-over prediction. One or more of the additional processing layers 270 may be a dense layer, an embedding layer, an output layer associated with a Sigmoid function, a bottleneck layer, etc.

One or more vehicle systems 290 may implement an action based on the operator take-over prediction. For example, if the operator take-over prediction is indicative of a likely or estimated operator take-over based on an object in the operating environment, one or more of the vehicle systems 290 may alert the operator that the system or autonomous vehicle is aware or has detected that object (e.g., via a display, via an audio alert using speakers, via an augmented reality heads-up-display, etc.). As another example, one or more of the vehicle systems 290 may apply the brakes, reduce speed, decelerate, etc. in response to the likely or estimated operator take-over. As yet another example, one or more of the vehicle systems 290 may provide or present more information to the operator based on the operator take-over prediction. Further, the amount of information presented to the operator may be based on the associated likelihood that the operator is estimated to take-over.

Figure 3:
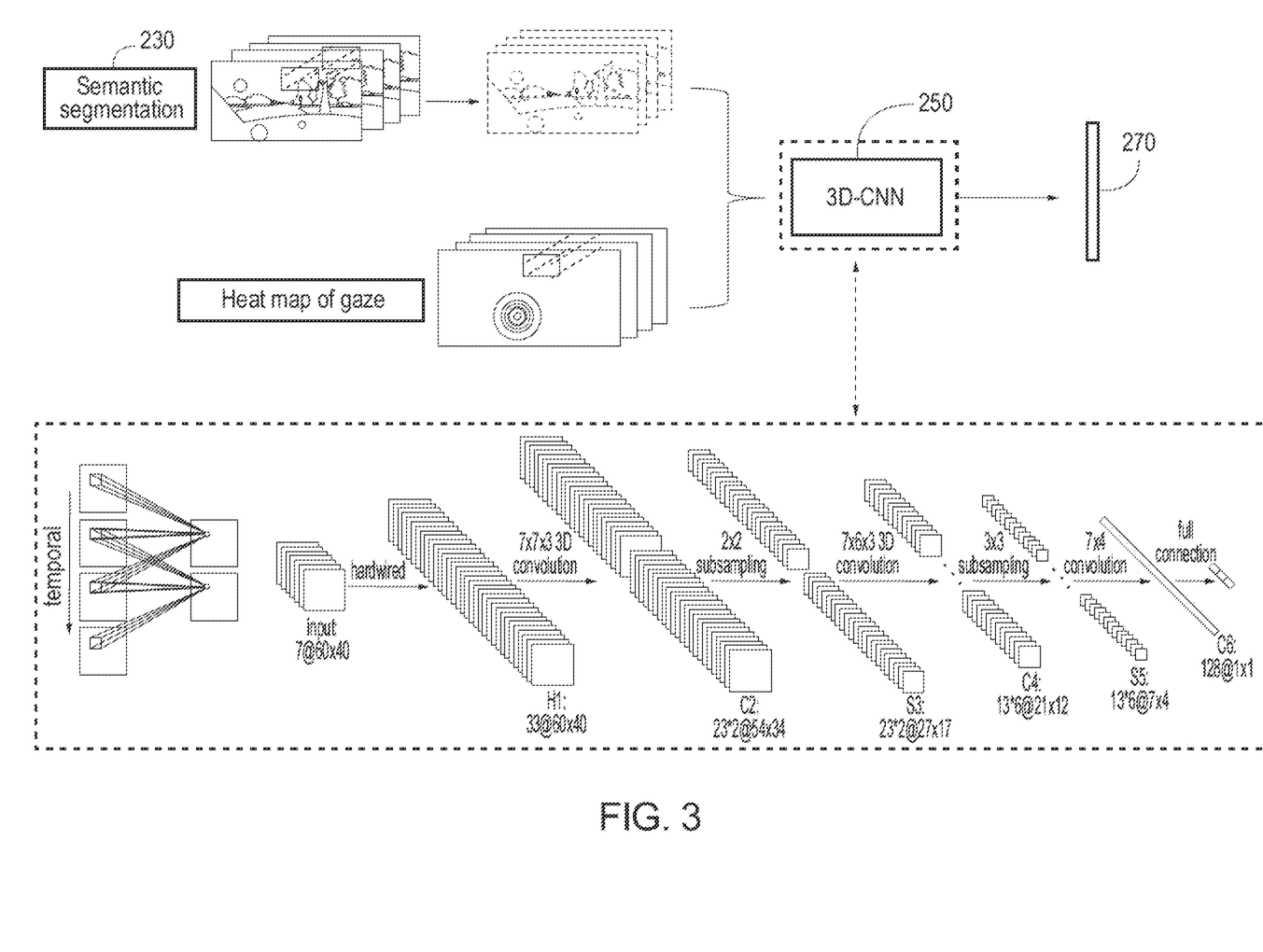
FIG. 3 is an exemplary component diagram of a system for operator take-over prediction, according to one aspect.

FIG. 3 is an exemplary component diagram of the system 200 for operator take-over prediction, according to one aspect. As seen in FIG. 3, the first series of images may include one or more labels corresponding to one or more classified objects from the operating environment. The second series of images may be represented as a gaze heatmap or eye tracking heatmap and be derived based on the eye tracking sensor 214 and/or one or more filters, such as a Gaussian filter or a Laplacian filter. The encoder 240 may encode the first series of images and the second series of images. The processor 222 may feed the encoded series of images through a three-dimensional (3D) convolutional neural network (CNN) to produce the first output.

Figure 4:
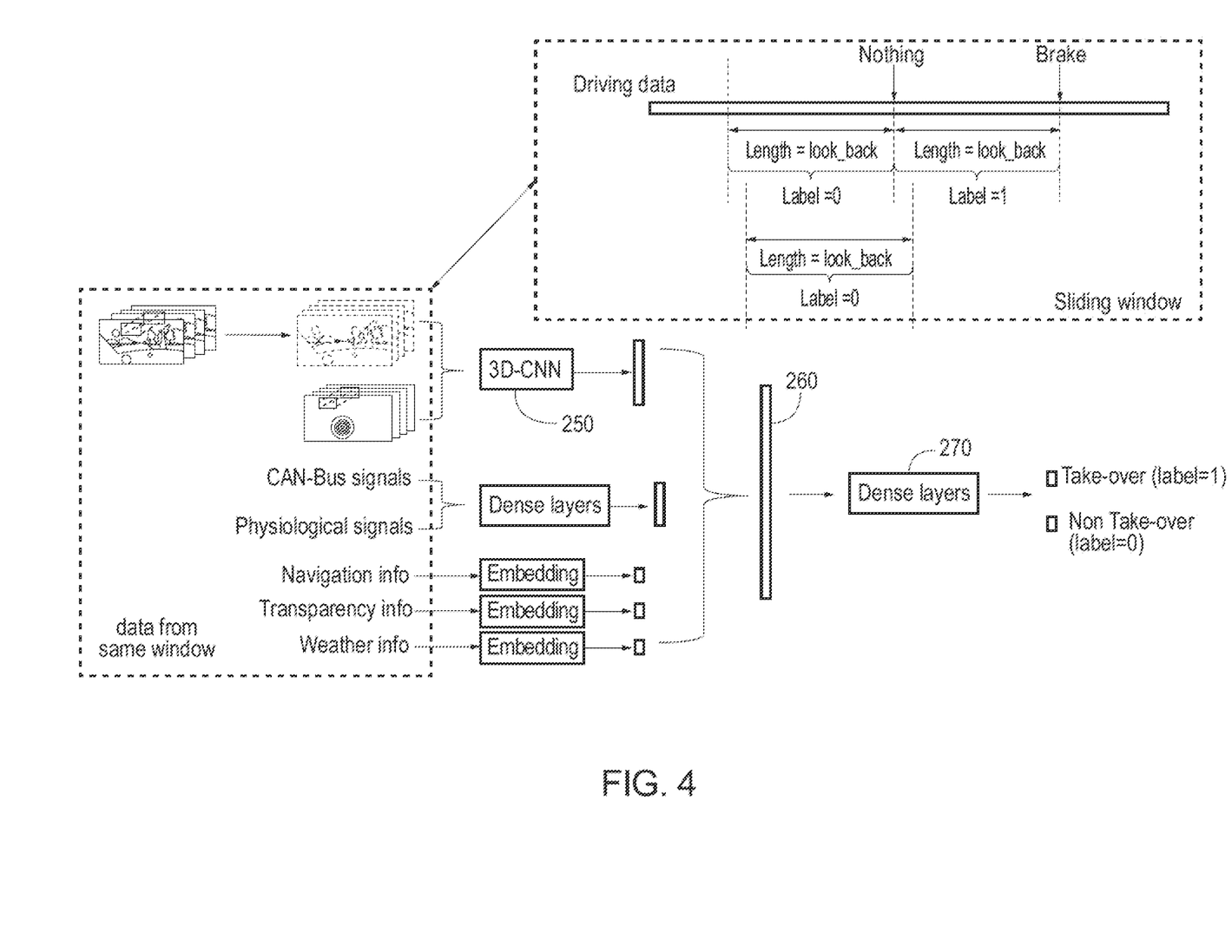
FIG. 4 is an exemplary component diagram of a system for operator take-over prediction, according to one aspect.

FIG. 4 is an exemplary component diagram of the system 200 for operator take-over prediction, according to one aspect. Continuing with the first output from FIG. 3, at the 3D CNN, this output may be concatenated with other information. For example, the processor 222 may receive one or more sets of information corresponding to the first series of images and the second series of images in time, such as the CAN bus signals, the physiological signals, the navigation information, the transparency information, the weather information, etc. The processor 222 may feed one or more of these sets of information through one or more processing layers 270, such as the dense layer or embedding layers to produce additional outputs. The processor 222 may concatenate the first output and the additional outputs to produce a concatenation output. The processor 222 may feed the concatenation output through one or more additional processing layers 270 to generate an operator take-over prediction.

Figure 5:
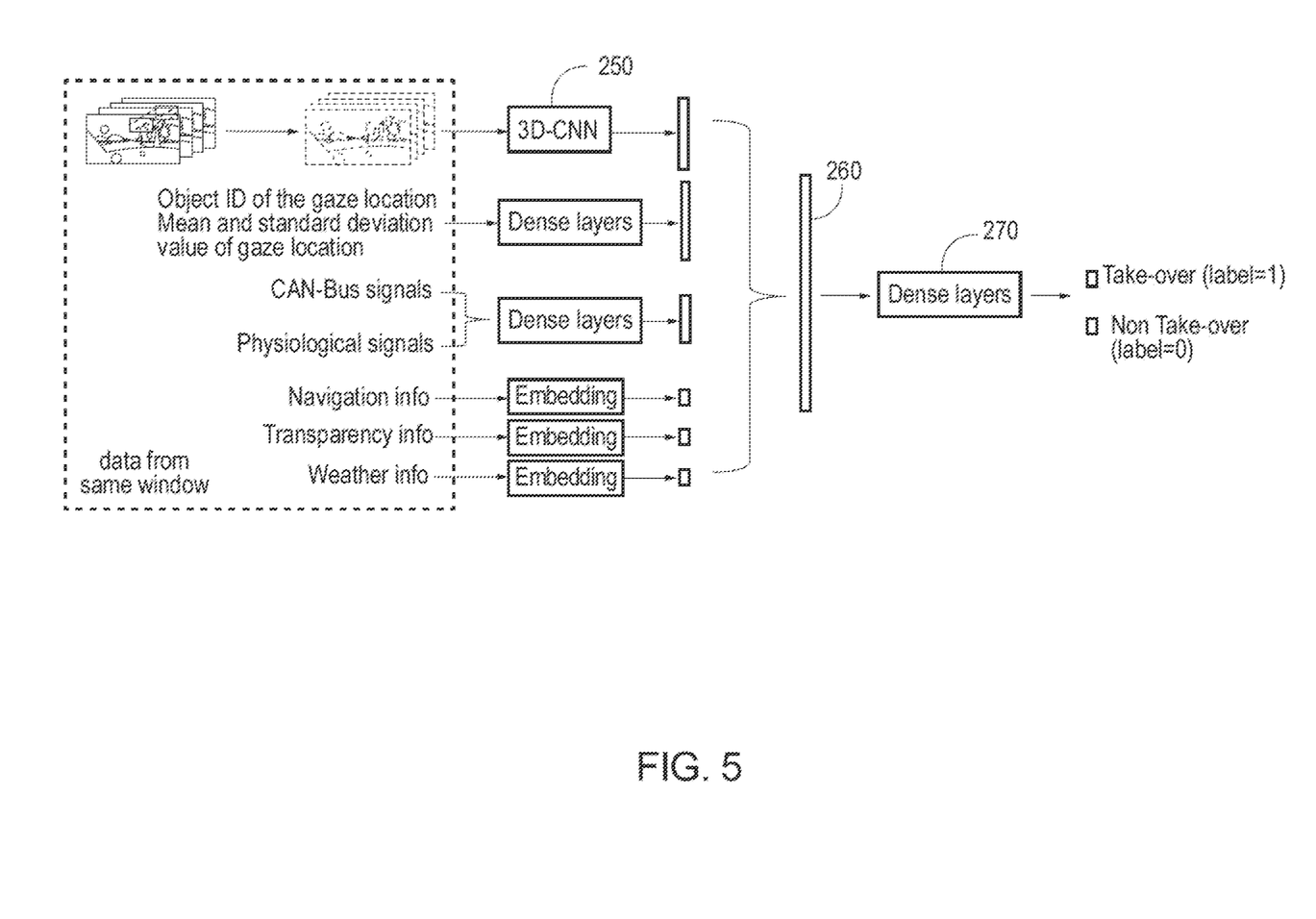
FIG. 5 is an exemplary component diagram of a system for operator take-over prediction, according to one aspect.

FIG. 5 is an exemplary component diagram of the system 200 for operator take-over prediction, according to one aspect. It may be seen that an object identification of the gaze location and mean and standard deviation value of gaze location may be fed through dense layers may be considered in lieu of the second series of images associated with the gaze heat-map, by contrast to FIG. 4.

Figure 6:
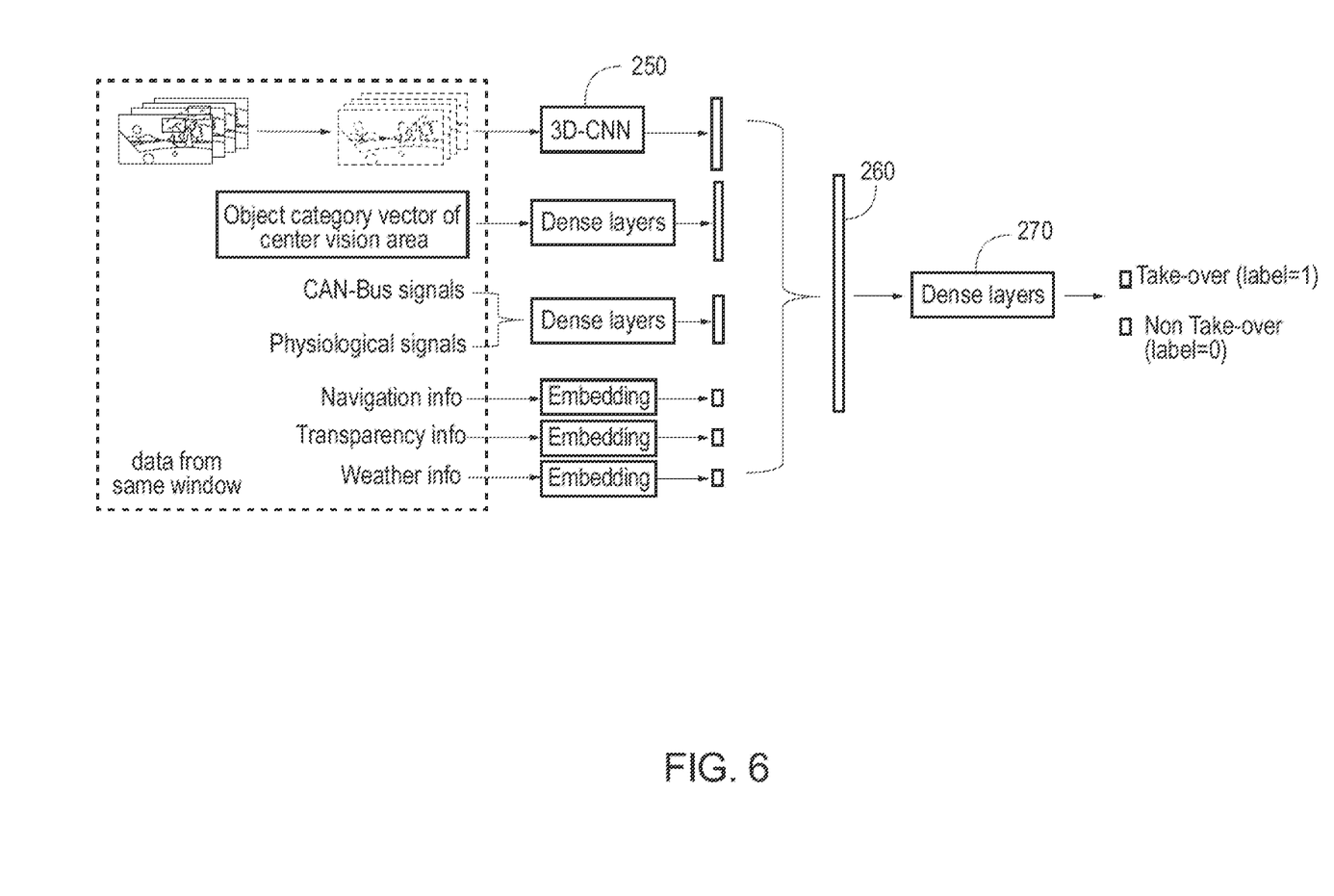
FIG. 6 is an exemplary component diagram of a system for operator take-over prediction, according to one aspect.

FIG. 6 is an exemplary component diagram of the system 200 for operator take-over prediction, according to one aspect. In FIG. 6, it may be seen that an object category vector of center vision area may be fed through dense layers may be considered in lieu of the second series of images associated with the gaze heat-map, by contrast to FIG. 4.

Figure 7:
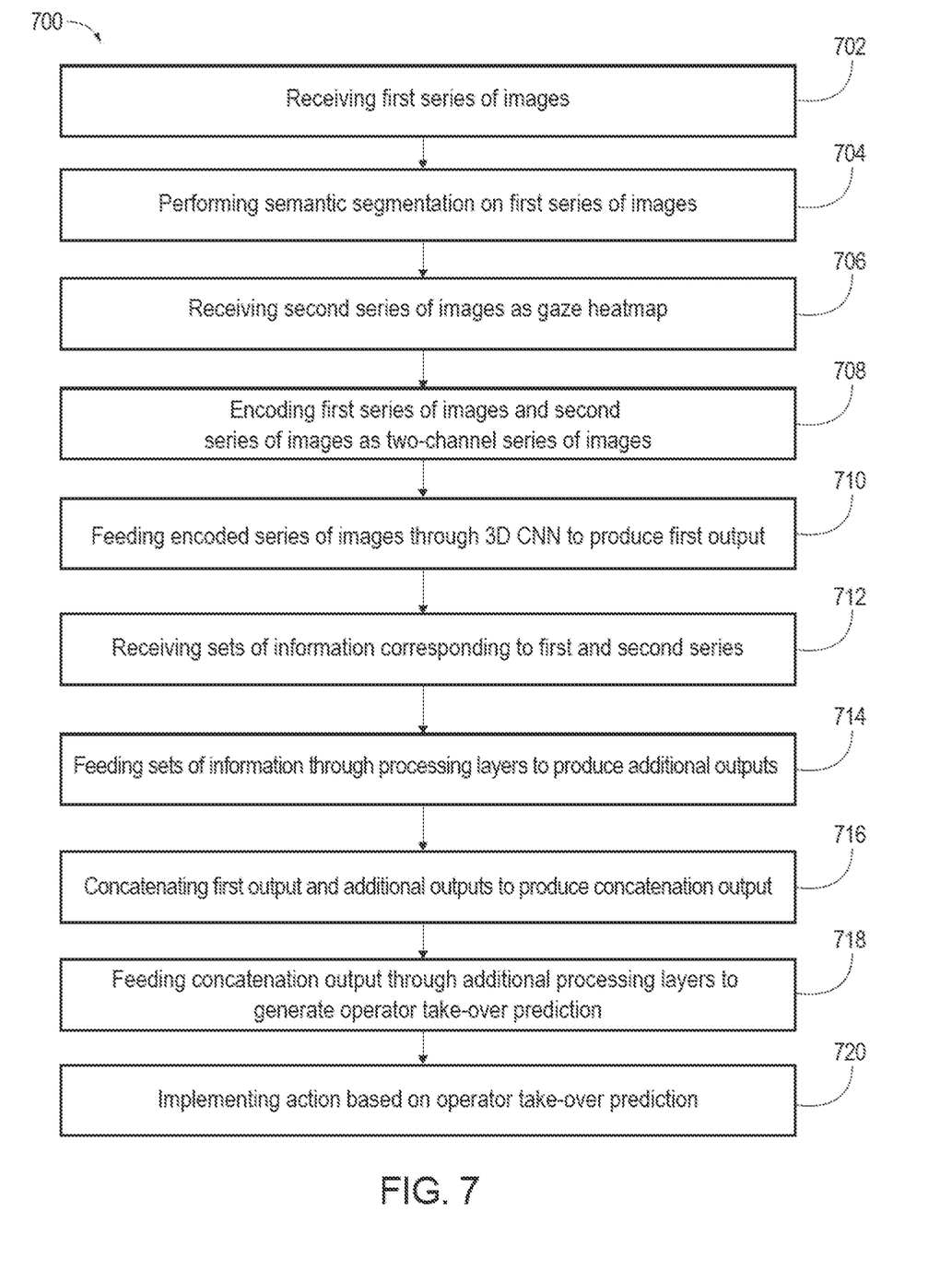
FIG. 7 is an exemplary flow diagram of a method or computer-implemented method for operator take-over prediction, according to one aspect.

Therefore, the aspects disclosed by FIGS. 6-7 relate to creating gaze information vector from gaze data rather than by joint embedding, and thus, the CNN convolution may be performed on a one-channel image, and no heat-map may be utilized according to this aspect.

FIG. 7 is an exemplary flow diagram of a method 700 or computer-implemented method for operator take-over prediction, according to one aspect. The computer-implemented method 700 for operator take-over prediction may include receiving 702 a first series of images of an operating environment through which a vehicle is travelling, performing semantic segmentation 704 on the first series of images to classify and associate pixels of the first series of images with one or more labels, and receiving 706 a second series of images of the operating environment through which the vehicle is travelling. The second series of images may be represented as a gaze heatmap or eye tracking heatmap. The second series of images may correspond to the first series of images in time. The computer-implemented method 700 for operator take-over prediction may include encoding 708 the first series of images and the second series of images as a two-channel series of images, feeding 810 the encoded series of images through a three-dimensional (3D) convolutional neural network (CNN) to produce a first output, receiving 712 one or more sets of information corresponding to the first series of images and the second series of images in time, feeding 714 one or more of the sets of information through one or more processing layers 270 to produce additional outputs, concatenating 716 the first output and the additional outputs to produce a concatenation output, feeding 718 the concatenation output through one or more additional processing layers 270 to generate an operator take-over prediction, and implementing 720 an action based on the operator take-over prediction.

Figure 8:
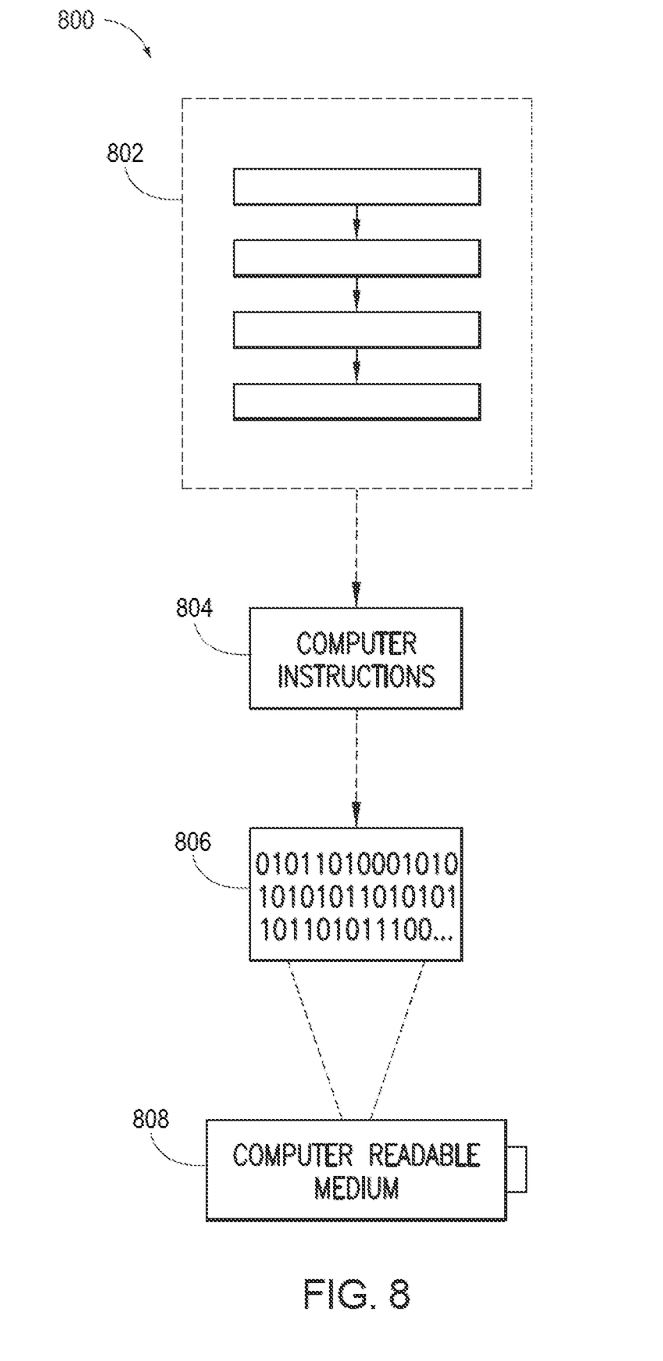
FIG. 8 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 8, wherein an implementation 800 includes a computer-readable medium 808, such as a CD-R, DVD-R, flash drive, a platter of a hard disk drive, etc., on which is encoded computer-readable data 806. This encoded computer-readable data 806, such as binary data including a plurality of zero's and one's as shown in 806, in turn includes a set of processor-executable computer instructions 804 configured to operate according to one or more of the principles set forth herein. In this implementation 800, the processor-executable computer instructions 804 may be configured to perform a method 802, such as the method 700 of FIG. 7. In another aspect, the processor-executable computer instructions 804 may be configured to implement a system, such as the system 600 of FIG. 6. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 9:
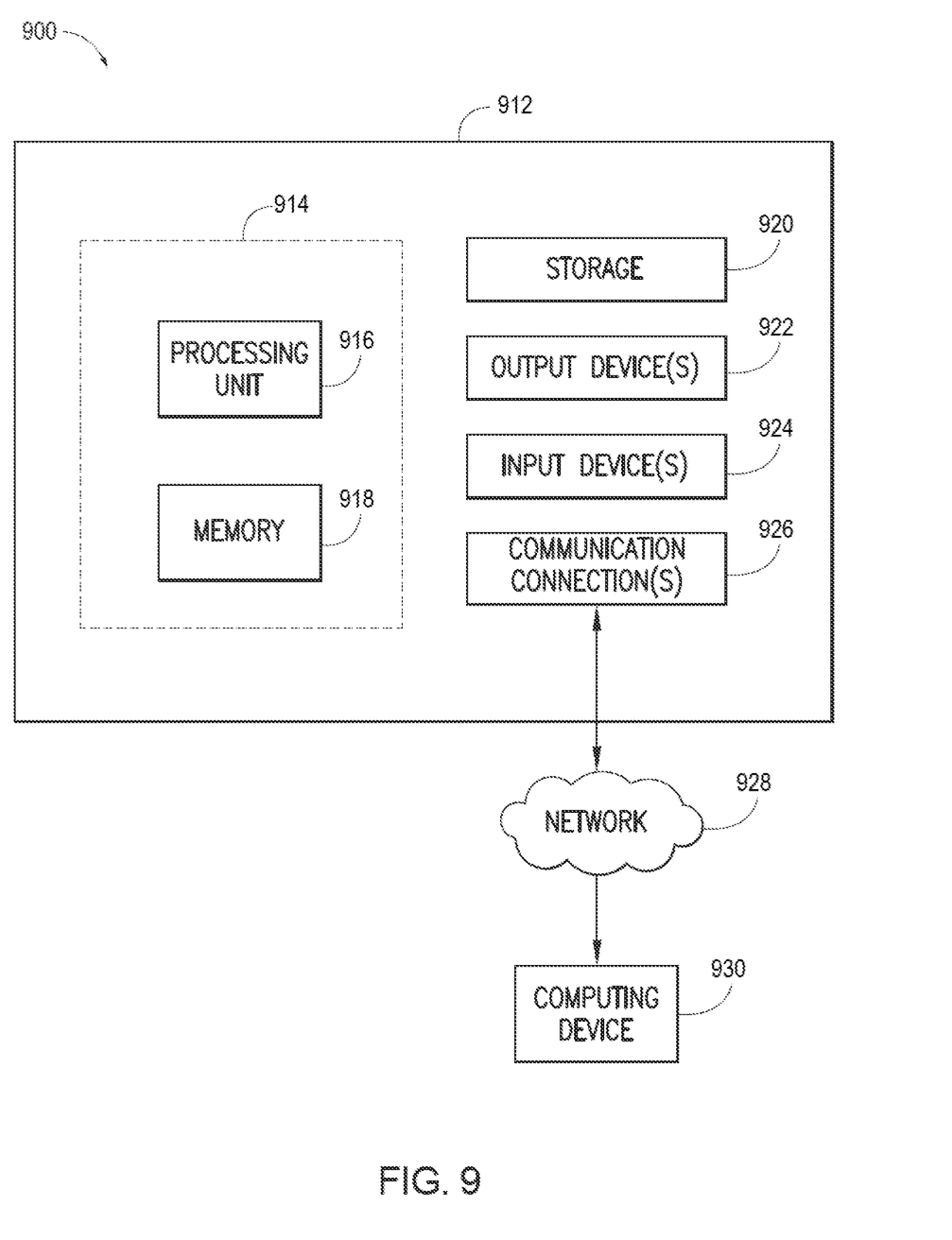
FIG. 9 is an illustration of an example computing environment where one or more of the provisions set forth herein are implemented, according to one aspect.

FIG. 9 and the following discussion provide a description of a suitable computing environment to implement aspects of one or more of the provisions set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 9 illustrates a system 900 including a computing device 912 configured to implement one aspect provided herein. In one configuration, the computing device 912 includes at least one processing unit 916 and memory 918. Depending on the exact configuration and type of computing device, memory 918 may be volatile, such as RAM, non-volatile, such as ROM, flash memory, etc., or a combination of the two. This configuration is illustrated in FIG. 9 by dashed line 914.

In other aspects, the computing device 912 includes additional features or functionality. For example, the computing device 912 may include additional storage such as removable storage or non-removable storage, including, but not limited to, magnetic storage, optical storage, etc. Such additional storage is illustrated in FIG. 9 by storage 920. In one aspect, computer readable instructions to implement one aspect provided herein are in storage 920. Storage 920 may store other computer readable instructions to implement an operating system, an application program, etc. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 912. Any such computer storage media is part of the computing device 912.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 912 includes input device(s) 924 such as keyboard, mouse, pen, voice input device, touch input device, infrared cameras, video input devices, or any other input device. Output device(s) 922 such as one or more displays, speakers, printers, or any other output device may be included with the computing device 912. Input device(s) 924 and output device(s) 922 may be connected to the computing device 912 via a wired connection, wireless connection, or any combination thereof. In one aspect, an input device or an output device from another computing device may be used as input device(s) 924 or output device(s) 922 for the computing device 912. The computing device 912 may include communication connection(s) 926 to facilitate communications with one or more other devices 930, such as through network 928, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A system for operator take-over prediction, comprising:
   a set of sensors receiving a two-channel series of images of an operating environment through which a vehicle is travelling, wherein the two-channel series of images is an encoded series of images associated with a first series of images capturing a road scene of the operating environment and a second series of images capturing a gaze of an operator of the vehicle, wherein the first series of images and the second series of images are derived from distinct sources, wherein the first series of images are represented by one or more labels corresponding to one or more classified objects, wherein the second series of images are represented as a gaze heatmap or eye tracking heatmap;
   a processor feeding the encoded series of images through a same three-dimensional (3D) convolutional neural network (CNN) to produce a first output, wherein the 3D CNN applies a 3D convolution over the two-channel series of images to extract a joint embedding of the first series of images and the second series of images in producing the first output;
   wherein the processor receives one or more sets of information corresponding to the first series of images and the second series of images in time;
   wherein the processor feeds one or more of the sets of information through one or more processing layers to produce additional outputs;
   wherein the processor concatenates the first output and the additional outputs to produce a concatenation output; and
   wherein the processor feeds the concatenation output through one or more additional processing layers to generate an operator take-over prediction; and
   one or more vehicle systems implementing an action based on the operator take-over prediction,
   wherein one or more of the sets of information corresponding to the first series of images and the second series of images in time includes gaze information from the operator of the vehicle, and
   the gaze information includes an object category vector associated with a center gaze area for a classified object of the one or more classified objects.

2. The system for operator take-over prediction of claim 1, wherein one or more of the sets of information corresponding to the first series of images and the second series of images in time includes controller area network (CAN) bus information from the vehicle.

3. The system for operator take-over prediction of claim 1, wherein one or more of the sets of information corresponding to the first series of images and the second series of images in time includes physiological information from the operator of the vehicle.

4. The system for operator take-over prediction of claim 1, wherein one or more of the sets of information corresponding to the first series of images and the second series of images in time includes navigation information from the vehicle.

5. The system for operator take-over prediction of claim 1, wherein one or more of the sets of information corresponding to the first series of images and the second series of images in time includes weather information from the operating environment through which the vehicle is travelling.

6. The system for operator take-over prediction of claim 1, wherein one or more of the processing layers is a dense layer.

7. The system for operator take-over prediction of claim 1, wherein one or more of the processing layers is an embedding layer.

8. The system for operator take-over prediction of claim 1, wherein the gaze information includes a mean gaze location value and a standard deviation gaze location value.

9. The system for operator take-over prediction of claim 1, wherein one or more of the processing layers is a bottleneck layer and the processor is further configured to concatenate one or more bottleneck layer features as input features to train a support vector machine.

10. A computer-implemented method for operator take-over prediction, comprising:
    receiving a two-channel series of images of an operating environment through which a vehicle is travelling, wherein the two-channel series of images is an encoded series of images associated with a first series of images capturing a road scene of the operating environment and a second series of images capturing a gaze of an operator of the vehicle, wherein the first series of images and the second series of images are derived from distinct sources, wherein the first series of images are represented by one or more labels corresponding to classified objects, wherein the second series of images are represented as a gaze heatmap or eye tracking heatmap;
    feeding the encoded series of images through a same three-dimensional (3D) convolutional neural network (CNN) to produce a first output, wherein the 3D CNN applies a 3D convolution over the two-channel series of images to extract a joint embedding of the first series of images and the second series of images in producing the first output;
    receiving one or more sets of information corresponding to the first series of images and the second series of images in time;
    feeding one or more of the sets of information through one or more processing layers to produce additional outputs;
    concatenating the first output and the additional outputs to produce a concatenation output;
    feeding the concatenation output through one or more additional processing layers to generate an operator take-over prediction; and presenting, to the operator of the vehicle, information associated with the generated operator take-over prediction, wherein an amount of the information presented to the operator is associated with a likelihood that the operator is estimated to take-over based on the generated operator take-over prediction, and wherein one or more of the sets of information corresponding to the first series of images and the second series of images in time includes gaze information from the operator of the vehicle, the gaze information includes an object category vector associated with a center gaze area for a classified object of the one or more classified objects.

11. The computer-implemented method for operator take-over prediction of claim 10, wherein one or more of the sets of information corresponding to the first series of images and the second series of images in time includes controller area network (CAN) bus information from the vehicle.

12. The computer-implemented method for operator take-over prediction of claim 10, wherein one or more of the sets of information corresponding to the first series of images and the second series of images in time includes physiological information from the operator of the vehicle.

13. The computer-implemented method for operator take-over prediction of claim 10, wherein one or more of the sets of information corresponding to the first series of images and the second series of images in time includes navigation information from the vehicle.

14. The computer-implemented method for operator take-over prediction of claim 10, wherein one or more of the sets of information corresponding to the first series of images and the second series of images in time includes weather information from the operating environment through which the vehicle is travelling.

15. The computer-implemented method for operator take-over prediction of claim 10, wherein one or more of the processing layers is a dense layer or an embedding layer.

16. The computer-implemented method for operator take-over prediction of claim 10, wherein one or more of the processing layers is a bottleneck layer and a processor is configured to concatenate one or more bottleneck layer features as input features to train a support vector machine.

17. A computer-implemented method for operator take-over prediction, comprising:

receiving a first series of images of an operating environment through which a vehicle is travelling, wherein the first series of images capture a road scene of the operating environment;

performing semantic segmentation on the first series of images to classify and associate pixels of the first series of images with one or more labels;

receiving a second series of images of the operating environment through which the vehicle is travelling, wherein the first series of images and the second series of images are derived from distinct sources, wherein the second series of images capture a gaze of an operator of the vehicle, wherein the second series of images is represented as a gaze heatmap or eye tracking heatmap, and wherein the second series of images correspond to the first series of images in time;

encoding the first series of images and the second series of images as a two-channel series of images;

feeding the encoded series of images through a same three-dimensional (3D) convolutional neural network (CNN) to produce a first output, wherein the 3D CNN applies a 3D convolution over the two-channel series of images to extract a joint embedding of the first series of images and the second series of images in producing the first output;

receiving one or more sets of information corresponding to the first series of images and the second series of images in time;

feeding one or more of the sets of information through one or more processing layers to produce additional outputs;

concatenating the first output and the additional outputs to produce a concatenation output;

feeding the concatenation output through one or more additional processing layers to generate an operator take-over prediction; and presenting, to the operator of the vehicle, information associated with the generated operator take-over prediction, wherein an amount of the information presented to the operator is associated with a likelihood that the operator is estimated to take-over based on the generated operator take-over prediction, and wherein one or more of the sets of information corresponding to the first series of images and the second series of images in time includes gaze information from the operator of the vehicle, and the gaze information includes an object category vector associated with a center gaze area for a classified object of the one or more classified objects.

18. The computer-implemented method for operator take-over prediction of claim 17, wherein the gaze information includes a mean gaze location value and a standard deviation gaze location value.

19. The computer-implemented method for operator take-over prediction of claim 17, wherein one or more of the processing layers is a bottleneck layer and the method further includes concatenating one or more bottleneck layer features as input features to train a support vector machine.

* * * * *